(12) United States Patent
Jamil et al.

(10) Patent No.: US 11,968,252 B2
(45) Date of Patent: *Apr. 23, 2024

(54) PEER SELECTION FOR DATA DISTRIBUTION IN A MESH NETWORK

(71) Applicant: ITRON, INC., Liberty Lake, WA (US)

(72) Inventors: Imad Jamil, Beynes (FR); Jerome Bartier, Edinburgh (GB); Fabrice Monier, Bry sur Marne (FR); Samuel De Vals, Louveciennes (FR)

(73) Assignee: ITRON, INC., Liberty Lake, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/151,102

(22) Filed: Jan. 6, 2023

(65) Prior Publication Data

US 2023/0156077 A1    May 18, 2023

Related U.S. Application Data

(63) Continuation of application No. 17/527,070, filed on Nov. 15, 2021, now Pat. No. 11,575,739.

(51) Int. Cl.
*G06F 15/16*    (2006.01)
*H04L 67/1008*    (2022.01)

(52) U.S. Cl.
CPC .............. *H04L 67/1008* (2013.01)

(58) Field of Classification Search
None
See application file for complete search history.

(56) References Cited

U.S. PATENT DOCUMENTS

| | | | |
|---|---|---|---|
| 8,619,576 B2 | 12/2013 | Vasseur et al. | |
| 8,902,903 B2 | 12/2014 | Palchaudhuri et al. | |
| 9,628,338 B2* | 4/2017 | Turon | H04W 84/18 |
| 10,057,123 B1* | 8/2018 | Knight | H04L 45/02 |
| 2009/0219941 A1 | 9/2009 | Cardozo et al. | |
| 2013/0121337 A1 | 5/2013 | Nguyen et al. | |
| 2015/0092535 A1 | 4/2015 | Kelsey | |
| 2017/0339653 A1 | 11/2017 | Hui et al. | |
| 2021/0133202 A1 | 5/2021 | Fry | |
| 2023/0156077 A1 | 5/2023 | Jamil et al. | |
| 2023/0254216 A1 | 8/2023 | Griffin et al. | |

FOREIGN PATENT DOCUMENTS

JP    2018-137516 A    8/2018

OTHER PUBLICATIONS

Non Final Office Action received for U.S. Appl. No. 18/159,018 dated Sep. 29, 2023, 21 pages.
International Search Report for application No. PCT/US2022/049572 dated Dec. 29, 2022.

* cited by examiner

*Primary Examiner* — Wing F Chan
*Assistant Examiner* — Andrew Woo
(74) *Attorney, Agent, or Firm* — Artegis Law Group, LLP

(57) ABSTRACT

Various embodiments disclose a method performed by a first node device in a mesh network that includes identifying a plurality of neighbor node devices that have one or more blocks of a dataset; determining quality scores for respective node devices of the plurality of neighbor node devices; selecting, based on the quality scores, a second node device from the plurality of neighbor node devices; and sending, to the second node device, a first request to receive at least one block of the one or more blocks.

20 Claims, 4 Drawing Sheets

PEER SELECTION FOR DATA DISTRIBUTION IN A MESH NETWORK

CROSS-REFERENCE TO RELATED APPLICATIONS

The present application is a continuation of United States application titled "PEER SELECTION FOR DATA DISTRIBUTION IN A MEASH NETWORK," filed on Nov. 15, 2021, and having Ser. No. 17/527,070. The subject matter of this related application is hereby incorporated herein by reference.

BACKGROUND

Field of the Various Embodiments

The various embodiments relate generally to wireless network communications, and more specifically, to peer selection for data distribution in a mesh network.

Description of the Related Art

A mesh network typically includes multiple electronic devices (referred to herein as "nodes") that are organized in a mesh topology and connect to one another either directly or indirectly in a dynamic, non-hierarchical fashion. In a mesh network, the nodes cooperate with one another to route data to and from the different nodes within the network as well as to and from devices outside the network. Mesh networks are becoming increasingly common in a wide variety of applications, including, and without limitation, home security and home automation systems, home network systems, smart grid systems, and other "Internet-of-Things" systems.

Typically, the nodes of a mesh network are communicatively coupled to each other by a wireless link, and the quality of the link between any two nodes can vary based on numerous factors. Such factors may include the data rate associated with the link, environmental factors (e.g., noise sources near one or both nodes), and the like, and can significantly reduce the speed and reliability of the link.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

As noted above, the nodes of a mesh network are communicatively coupled to each other by a link, and the quality of the link between any two nodes can vary based on numerous factors. Such factors can include the data rate associated with the link, environmental factors (e.g., noise sources near one or both nodes), and the like, and can significantly reduce the speed and reliability of the link. As a result, the speed at which data can be transferred along a higher-quality link in a mesh network can be greater than that of a lower-quality link by as much as an order of magnitude or more. Consequently, the efficiency with which a particular data transfer occurs within a mesh network can depend heavily on the specific links employed to implement the data transfer. Further, as environmental conditions and traffic flow change over time within the mesh network, the quality of any particular link between two nodes can degrade or improve. Therefore, a particular data transfer path within the mesh network can include higher-quality links when a large data transfer is initiated, but degrade over time to include lower-quality links, which can deleteriously affect completion of the data transfer.

To address these shortcomings, techniques disclosed herein facilitate data transfer within a mesh network. In some embodiments, a data transfer from a neighbor node in the mesh network is not limited to being carried out by the first neighbor node that replies to a request for the data transfer. Instead, the neighbor node having the highest quality score is selected for the data transfer, such as a neighbor node that has the best or most reliable link with the requesting node. Further, in some embodiments, over the course of the data transfer, a periodic check is performed to determine whether a neighbor node that has a higher-quality connection is available to complete the data transfer.

At least one technical advantage of the disclosed techniques relative to the prior art is that, with the disclosed techniques, the speed of large data transfers in a mesh network can be significantly improved. A further advantage is that as a higher-quality link becomes available during a large data transfer, the data transfer can be automatically switched to the higher-quality link thereby improving the overall quality of the data transfer. These technical advantages provide one or more technological improvements over prior art approaches.

System Overview

Figure 1:
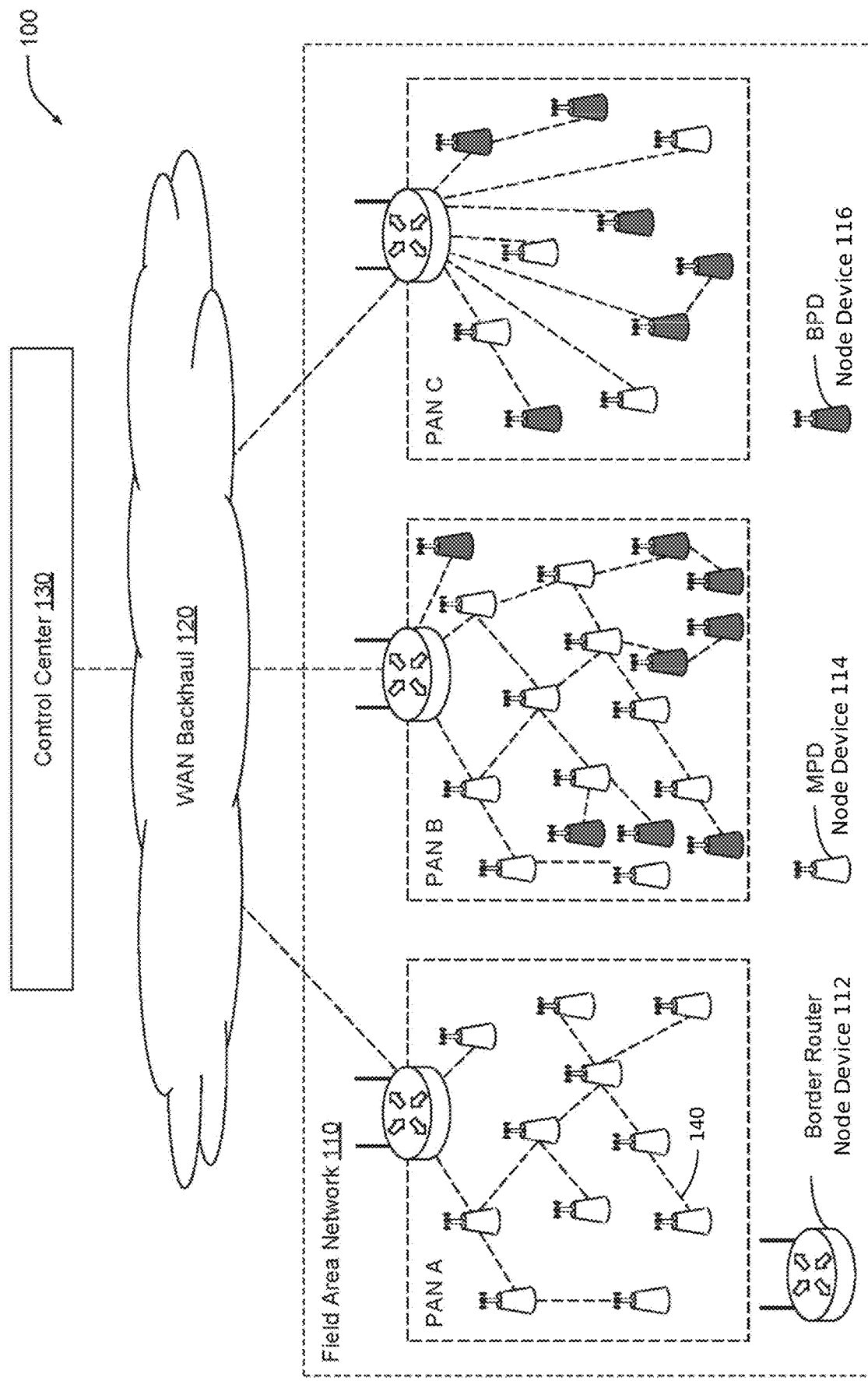
FIG. 1 illustrates a network system configured to implement one or more aspects of the various embodiments.

FIG. 1 illustrates a network system configured to implement one or more aspects of the various embodiments. As shown, network system 100 includes, without limitation, field area network (FAN) 110, wide area network (WAN) backhaul 120, and control center 130. FAN 110 is coupled to control center 130 via WAN backhaul 120. Control center 130 is configured to coordinate the operation of FAN 110. Network system 100 includes a plurality of node devices that are configured to communicate with each other according to the techniques described herein.

FAN 110 includes personal area network (PANs) A, B, and C. PANs A and B are organized according to a mesh network topology, while PAN C is organized according to a star network topology. Each of PANs A, B, and C includes at least one border router node device 112 and one or more mains-powered device (MPD) node devices 114. PANs B and C further include one or more battery-powered device (BPD) node devices 116.

MPD node devices 114 draw power from an external power source, such as mains electricity or a power grid. MPD node devices 114 typically operate on a continuous basis without powering down for extended periods of time. BPD node devices 116 draw power from an internal power source, such as a battery or other local source (e.g., solar cell, etc.). BPD node devices 116 typically operate intermittently and, in some embodiments, can power down for extended periods of time in order to conserve battery power. MPD node devices 114 and/or BPD node devices 116 are configured to gather sensor data, process the sensor data, and communicate data processing results and/or other information to control center 130. Border router node devices 112 operate as access points that provide MPD node devices 114 and BPD node devices 116 with access to control center 130.

Any of border router node devices 112, MPD node devices 114, and/or BPD node devices 116 are configured to communicate directly with one or more adjacent node devices or node devices that are at a distance of one hop (also referred to as neighbors or neighbor node devices) via bi-directional communication links. In many instances, neighbor node devices may be physically closer than other node devices in network system 100, while in other instances, this is not the case, for example due to physical barriers that impede communication between physically proximate nodes. In various embodiments, a given communication link may be wired or wireless links, although in practice, adjacent node devices of a given PAN exchange data with one another by transmitting data packets via wireless radio frequency (RF) communications. The various node device types are configured to perform a technique, known in the art as "channel hopping," in order to periodically transition between different channels and receive data frames on those different channels. The particular sequence of channels across which a node transitions is referred to as a "listening schedule," "channel hopping sequence" or a "channel schedule." In a listening schedule, each channel in the schedule is associated with a respective time slot. As known in the art, a "channel" may correspond to a particular range of frequencies. In one embodiment, a node device computes a current "transmit" or "receive" channel by evaluating a Jenkins hash function that is based on a total number of channels, the media access control (MAC) address of the node device, and/or other information associated with the node device.

In operation, each node device within a given PAN can implement a discovery protocol to identify one or more adjacent node devices or "neighbors." In such instances, a node device that has identified an adjacent, neighboring node device may establish a bi-directional communication link 140 with the neighboring node device. Each neighboring node device can update a respective neighbor table to include information concerning the other node device, including the MAC address of the other node device, as well as a received signal strength indication (RSSI) of communication link 140 established with that node device. In various embodiments, the neighbor table can include information about one or more communication modes (referred to herein as physical layer modes) that the neighbor mode is capable of supporting. Each physical layer mode can be associated with one or more different operating parameters (e.g., data rates, modulation scheme, channel spacing, frequencies supported, listening schedule, etc.).

Node devices can compute the listening schedules of adjacent node devices in order to facilitate successful transmission of data packets to such node devices. In embodiments where node devices implement the Jenkins hash function, a node device may compute a "current receive" channel of an adjacent node device using the total number of channels, the MAC address of the adjacent node device, and/or a time slot number assigned to a current time slot of the adjacent node device.

Examples of different physical layer modes include, without limitation, a default physical layer mode and a long-range physical layer mode. Generally, the operating parameters of a default physical layer mode are configured for efficient operation of a given PAN. Thus, the default physical layer mode is typically employed by node devices within the PAN for most communication links. By contrast, the operating parameters of a long-range physical layer mode are configured for longer-range communications within the PAN, for example to prevent node devices from being orphaned. In some embodiments, the long-range physical layer mode of a particular node device differs from the default physical layer mode of the particular node device by at least one operating parameter. In such embodiments, when the node device employs the long-range physical layer mode, the at least one operating parameter is selected in the long-range physical layer mode to enable longer-range communications between the node devices. For example, in some embodiments, a data rate associated with the long-range physical layer mode for the particular node device is lower than a data rate associated with the default physical layer mode for the particular node device. Thus, in such embodiments, data transfer between two node devices employing the long-range physical layer mode is slower than data transfer between two node devices employing the default physical layer mode, but such data transfer can be performed reliably over a longer range and/or under noisier conditions. Further, in some embodiments, a listening duty cycle associated with the long-range physical layer mode for the particular node device is lower than a listening duty cycle associated with the default physical layer mode for the particular node device. Thus, in such embodiments, data transfer between two node devices employing the long-range physical layer mode is slower than data transfer between two node devices employing the default physical layer mode.

Any of the node devices discussed above can operate as a source node device, an intermediate node device, or a destination node device for the transmission of data packets. In some embodiments, a given source node device can generate a data packet and then, (in mesh network topologies), transmit the data packet to a destination node device via any number of intermediate node devices. In such instances, the data packet may indicate a destination for the packet and/or a particular sequence of intermediate node devices to traverse in order to reach the destination node device. In some embodiments, each intermediate node device can include a forwarding database indicating various network routes and cost metrics associated with each route.

Node devices 112, 114, 116 transmit data packets across a given PAN and across WAN backhaul 120 to control center 130. Similarly, control center 130 transmits data packets across WAN backhaul 120 and across any given PAN to a particular node device 112, 114, 116 included therein. As a general matter, numerous routes can exist which traverse any of PANs A, B, and C and include any number of intermediate node devices, thereby allowing any given node device or other component within network system 100 to communicate with any other node device or component included therein.

Control center 130 includes one or more server machines (not shown) configured to operate as sources for, and/or destinations of, data packets that traverse within network system 100. In various embodiments, the server machines can query node devices within network system 100 to obtain various data, including raw and/or processed sensor data, power consumption data, node/network throughput data, status information, and so forth. The server machines can also transmit commands and/or program instructions to any node device 112, 114, 116 within network system 100 to cause those node devices to perform various operations. In one embodiment, each server machine is a computing device configured to execute, via a processor, a software application stored in a memory to perform various network management operations.

In various embodiments, node devices 112, 114, 116 can include computing device hardware configured to perform processing operations and execute program code. Each node device can further include various analog-to-digital (A/D) converters, digital-to-analog (D/A) converters, digital signal processors (DSPs), harmonic oscillators, transceivers, and/or any other components generally associated with RF-based communication hardware.

Figure 2:
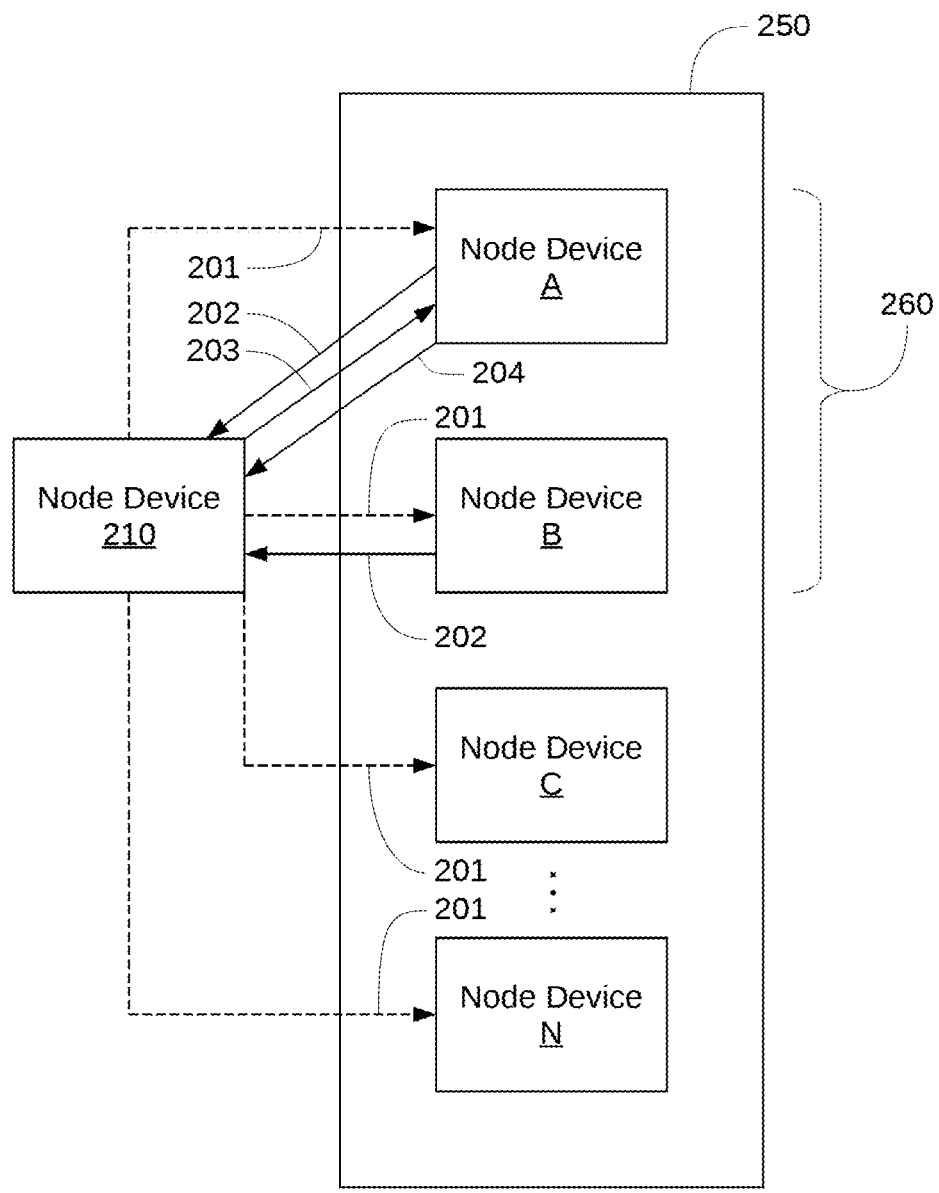
FIG. 2 illustrates a node device and a plurality of neighbor node devices, according to various embodiments.

FIG. 2 illustrates a node device 210 and a plurality 250 of neighbor node devices A-N, according to various embodiments. Node device 210 can be a node device that operates within network system 100 of FIG. 1, such as any of node devices 112, 114, 116.

In operation, node device 210 transmits a broadcast signal 201 to neighbor node devices A-N, such as a request to determine which of neighbor node devices A-N has a dataset. As shown, neighbor node device A sends a response 202 indicating that the dataset is available at neighbor node device A, and neighbor node device B sends a response 202 indicating that the dataset is available at neighbor node device B. Because the dataset is not available at neighbor node devices C-N, no further responses 202 are sent to node device 210. Thus, responses 202 are received by node device 210 from a set 260 of plurality 250 of neighbor node devices A-N. According to various embodiments, node device 210 determines a quality ranking of the individual node devices in set 260, which in the instance illustrated in FIG. 2 includes node device A and node device B. For example, the quality ranking can be based on quality scores determined for the node devices in set 260. Node device 210 determines which node device in set 260 has the highest quality score, and transmits a data request 203 to that node device (e.g., neighbor node device A). For example, data request 203 can be a request for a portion of the dataset. In response, neighbor node A transmits the requested portion 204 of the data set.

Node Device

Figure 3:
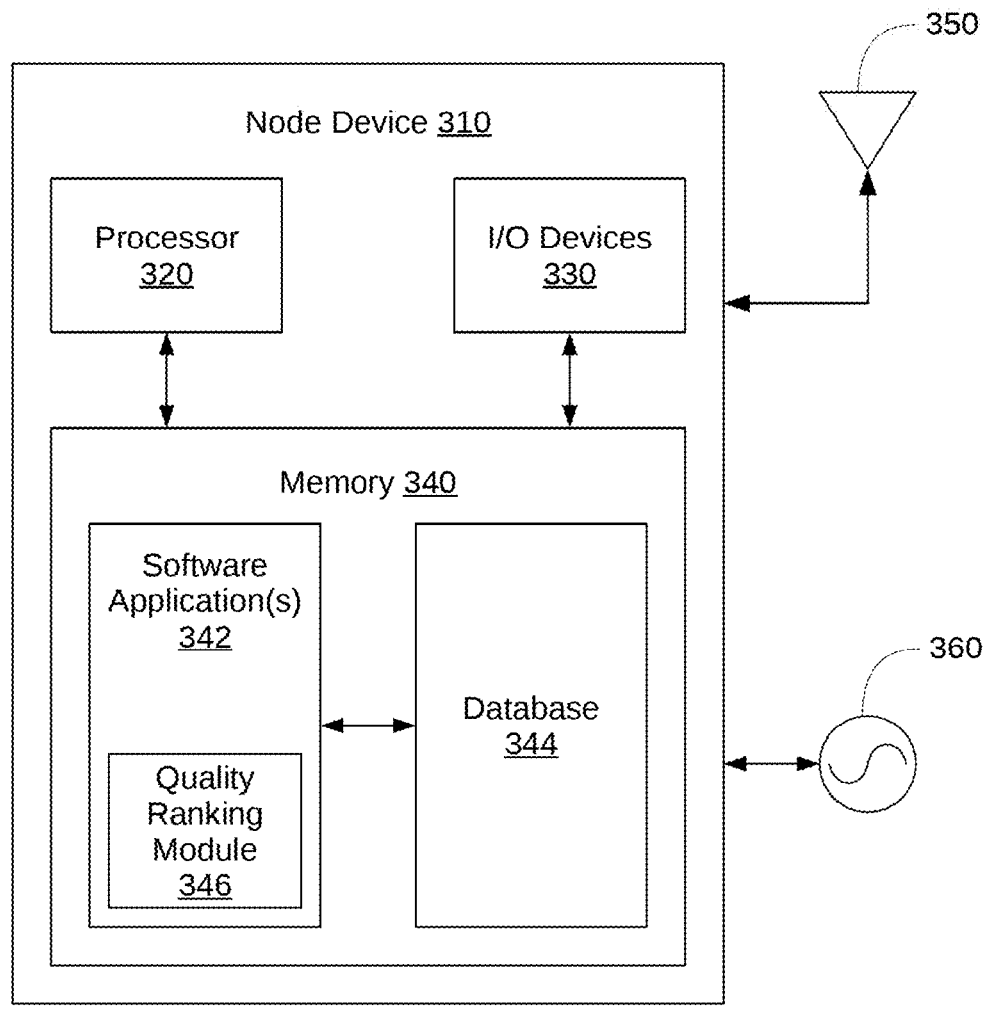
FIG. 3 illustrates a node device configured to transmit and receive data within the network system of FIG. 1, according to various embodiments.

FIG. 3 illustrates a node device configured to transmit and receive data within the network system 100 of FIG. 1, according to various embodiments. As shown, node device 310 is coupled to transceiver 350 and oscillator 360. Node device 310 includes, without limitation, a processor 320, input/output devices 330, and memory 340. Memory 340 includes one or more applications (e.g., software application 342 and/or a quality ranking module 346) that communicate with database 344.

Processor 320 coordinates the operations of node device 310. Transceiver 350 is configured to transmit and/or receive data packets and/or other messages across network system 100 using a range of channels and power levels. Oscillator 360 provides one or more oscillation signals, according to which, in some embodiments, node device 310 may schedule the transmission and reception of data packets. In some embodiments, node device 310 can be used to implement any of border router node devices 112, MPD node devices 114, and/or BPD node devices 116 of FIG. 1.

In various embodiments, processor 320 can include any hardware configured to process data and execute software applications. Processor 320 can include a real-time clock (RTC) (not shown) according to which processor 320 maintains an estimate of the current time. The estimate of the current time can be expressed in Universal Coordinated Time (UTC), although any other standard of time measurement can also be used. I/O devices 330 include devices configured to receive input, devices configured to provide output, and devices configured to both receive input and provide output. Memory 340 can be implemented by any technically-feasible computer-readable storage medium.

Memory 340 includes one or more software applications 342 (such as quality ranking module 346) and database 344, coupled together. The one or more software applications includes program code that, when executed by processor 320, can perform any of the node-oriented computing functionality described herein. The one or more software applications 342 can also interface with transceiver 350 to coordinate the transmission and/or reception of data packets and/or other messages across network system 100, where the transmission and/or reception is based on timing signals generated by oscillator 360. In various embodiments, memory 340 can be configured to store protocols used in communication modes, equations and/or algorithms for identifying metric values, constants, data rate information, listening schedules, and other data used in identifying metric values, etc. In various embodiments, memory 340 may be configured to store a neighbor table and/or other information associated with neighbor node devices and links with neighbor node devices.

In operation, software application(s) 342 can implement various techniques to optimize communications with one or more linked node devices, such as a neighboring node device. In various embodiments, node device 310 can be configured to, using a plurality of different communication modes, transmit data messages to the linked node device and/or receive data messages from the linked node device by selecting a common communication mode (such as a physical layer mode) that is supported by node device 310 and the linked node device. More generally, node device 310 can be configured for multi-mode communications. Node device 310 can communicate with a linked node or with control center 130 using any of a plurality of modes. The particular mode used for a given transmission depends on the particular circumstances of the transmission (e.g., the type of data message, the intended recipients of the data message, etc.). Examples of the modes include, without limitation, unicast, broadcast, and multi-cast.

Large Dataset Transmission Using Multiple Physical Layer Modes

According to various embodiments, transfer of a large dataset within a mesh network is facilitated. For example, the speed of the viral distribution of a firmware image throughout the mesh network or the forwarding of a large dataset between neighbor node devices of the mesh network can be increased using the techniques described herein. In the embodiments, peer selection for the transfer of a dataset to a particular node device is based on a quality ranking of multiple neighbor node devices, where the neighbor node device having the dataset and with the highest quality score is selected to transfer at least a portion of the dataset to the particular node device. In addition, in some embodiments, during the transfer of the dataset, a periodic check is performed to determine whether another neighbor node device having the dataset and with a higher quality score is available to perform a transfer of a further portion of the dataset. In such embodiments, the data transfer is switched when a neighbor node device with a higher quality score is determined to be available. Example embodiments are described below in conjunction with FIG. 4.

Figure 4:
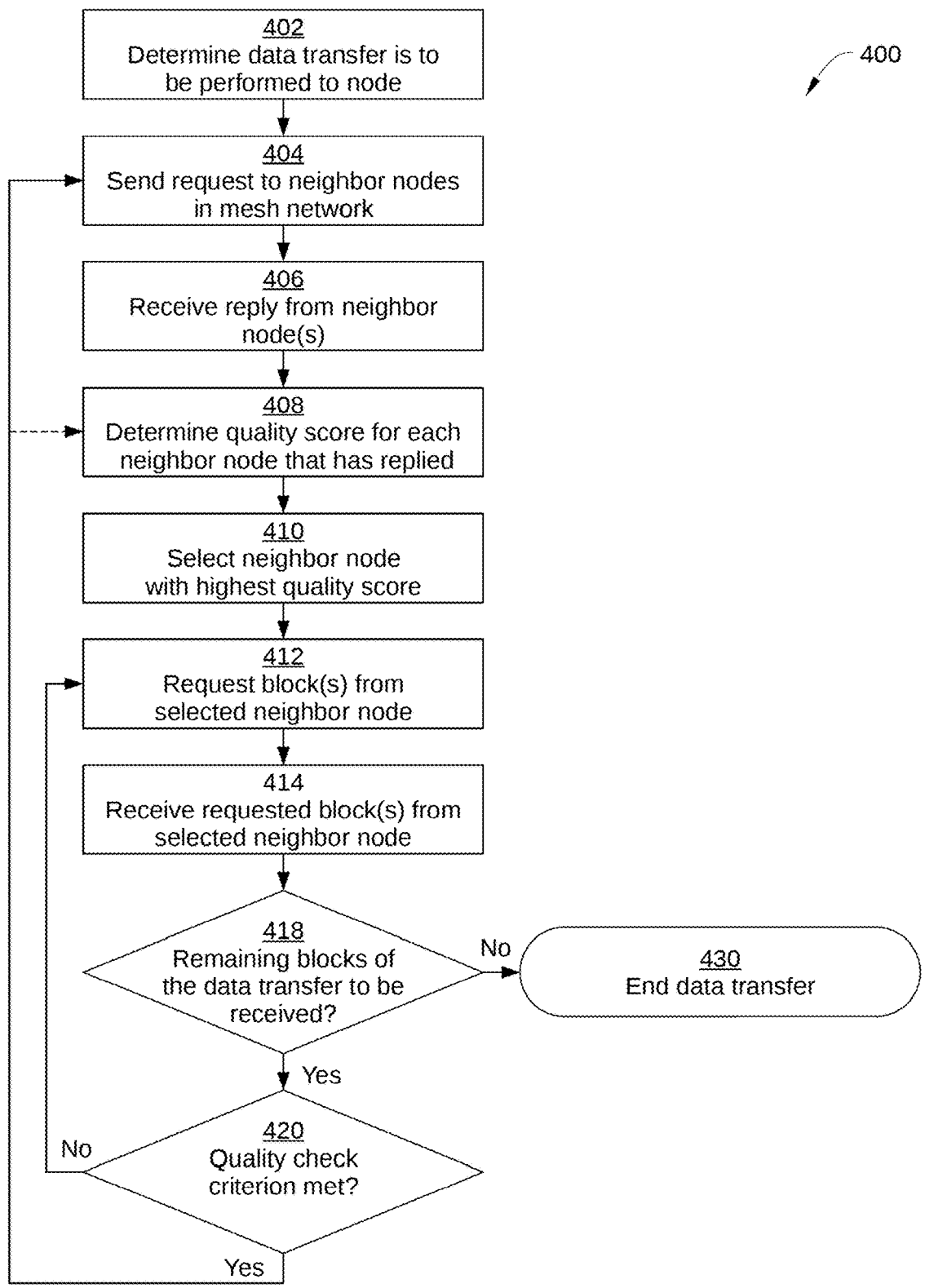
FIG. 4 is a flow diagram of method steps for performing data transfer within a mesh network, according to various embodiments.

FIG. 4 is a flow diagram of method steps for performing data transfer within a mesh network, according to various embodiments. Although the method steps are described with respect to the systems of FIGS. 1-3, persons skilled in the art will understand that any system configured to perform the method steps, in any order, falls within the scope of the various embodiments.

As shown, a method 400 begins at step 402, where node device 310 determines that a data transfer is to be performed to node device 310. For example, in some embodiments, node device 310 receives a notification that a firmware image is available. In such embodiments, such a notification is received as part of a firmware upgrade operation for the mesh network. Generally, such a firmware upgrade operation includes a seeding phase, in which a back office associated with the mesh network (such as control center 130 in FIG. 1) selects one or more node devices of the mesh network and transmits the firmware image thereto. A notification is then propagated throughout the mesh network from the back office indicating that each node device of the network should attempt to acquire a firmware image file from neighbor node devices. As a result, viral distribution of the firmware upgrade (for example as a firmware image file) proceeds throughout the mesh network.

Because a firmware image file can be relatively large, the transmission of such a file from one node device to another within a mesh network can occur over a significant time interval, for example on the order of one to two hours or more. Consequently, such files are typically separated into multiple blocks of data, sometimes referred to as "chunks." For example, in some instances, a firmware image file can include 100 or more such blocks or chunks.

In some embodiments, node device 310 determines in step 402 that a data transfer of a dataset is to be performed to node device 310 that is not associated with a firmware upgrade for node devices of the mesh network. In such embodiments, the data transfer can include the transfer of any dataset to node device 310 that includes multiple blocks of data. In such embodiments, the dataset can be a dataset that is being forwarded to node device 310 and/or routed through node device 310.

In step 404, node device 310 sends a request to neighbor nodes in the mesh network. Generally, the request is to determine whether a neighbor node has the dataset referenced in step 402. In some embodiments, node device 310 determines the neighbor node devices based on information included in a locally stored neighbor table. In such embodiments, the neighbor table may include information for each neighbor node device, such as the type of communication link established between node device 310 and the neighbor node (e.g., a link established via a long-range physical layer mode or a default physical layer mode), a current data rate between node device 310 and the neighbor node device, a packet success rate between node device 310 and the neighbor node device, a current traffic level at the neighbor node device, and/or the like.

In some embodiments, the request is sent to neighbor node devices in a specific order in step 404. In such embodiments, the order in which the request is sent can be based on one or more factors associated with communications between node device 310 and each neighbor node device, such as the type of communication link established between node device 310 and the neighbor node device, a current data rate between node device 310 and the neighbor node device, a packet success rate between node device 310 and the neighbor node device, a current traffic level at the neighbor node device, and/or the like. In such embodiments, the request is sent to neighbor node devices in a descending order. Thus, in such embodiments, the request is first sent to the neighbor node device associated with a best value for the one or more factors, the request is then sent to the neighbor node device associated with a second-best value for the one or more factors, and so on.

In step 406, node device 310 receives a reply from one or more neighbor node devices. In some embodiments, such a reply is received from neighbor node devices that currently have the dataset referenced in the request of step 404.

In step 408, node device 310 determines a quality score for each neighbor node device that has replied. In some embodiments, node device 310 performs an initial iteration of step 408 after a specified time interval has elapsed since the request was sent in step 404. In such embodiments, a duration of the specified time interval can be selected to enable most or all neighbor node devices to receive the request sent in step 404 and transmit a response. For example, in some embodiments, the specified time interval can be on the order of about 30 seconds, one minute, five minutes, or more. In other embodiments, node device 310 does not perform the initial iteration of step 408 until each neighbor node device in the neighbor table sends a reply to node device 310 and/or an acknowledgment of receipt of the request of step 404. In yet other embodiments, node device 310 does not perform the initial iteration of step 408 until at least a predetermined threshold number of neighbor node devices in the neighbor table sends a reply to node device 310 and/or an acknowledgment of receipt of the request of step 404. For example, in some embodiments, the predetermined threshold number is equal to half the number of the neighbor node devices in the neighbor table. In yet other embodiments, node device 310 performs the initial iteration of step 408 when the first reply is received from a neighbor node device. In such embodiments, the request is send to neighbor node devices in a specific order in step 404, so the first reply corresponds to a neighbor node device that is associated with a higher value for the one or more factors associated with communications between node device 310 and each neighbor node device.

In some embodiments, node device 310 determines a quality score for each neighbor node device that has replied indicating the requested dataset can be transmitted. In such embodiments, node device 310 determines these quality scores based on at least one quality factor. For example, in some embodiments, one such quality factor is a binary factor indicating whether a particular neighbor node device is communicatively coupled to node device 310 via a higher-performance (or high data rate) link, such as a link operating in a default physical layer mode, or a lower-performance (or low data rate) link, such as a link operating in a long-range physical layer mode. In such embodiments, node device 310 assigns a higher quality score for a neighbor node device that is communicatively coupled to node device 310 via a higher-performance link and a lower quality score for a neighbor node device that is communicatively coupled to node device 310 via a lower-performance link. In some embodiments, node device 310 determines quality scores based solely on the type of link communicatively coupling node device 310 to the neighbor node device, e.g., whether a neighbor node device is communicatively coupled to node device 310 via a higher-performance link or a lower-performance link. In other embodiments, node device 310 determines a quality score for a neighbor node device based on other factors in addition to or in lieu of the type of link communicatively coupling node device 310 to the neighbor node device.

Examples of other factors on which node device 310 may base a quality score for a neighbor node device include, without limitation: a current data rate between node device 310 and the neighbor node device, a packet success rate between node device 310 and the neighbor node device, a current traffic level at the neighbor node device, and/or the like. In some embodiments, the quality score for a neighbor node device can be based on a combination of two or more of the above factors. In such embodiments, the quality score for the neighbor node device can be based on a weighted combination of the two or more factors, where different factors can have a different weighting.

In some embodiments, node device 310 determines a quality score for some or all of the neighbor node devices based on peer information already included in a neighbor table or other locally stored data structure. In such embodiments, node device 310 can perform the quality score determination of step 408 without requesting additional information from the neighbor node devices, which avoids additional overhead in the traffic of the mesh network. Examples of such information include, without limitation, the type of communication link established between node device 310 and the neighbor node device, a current data rate between node device 310 and the neighbor node device, a packet success rate between node device 310 and the neighbor node device, and/or the like.

In step 410, device node 310 selects the neighbor node device with the highest quality score. It is noted that during the transfer of a large dataset from a neighbor node device to node device 310, environmental conditions and traffic flow can change within the mesh network, and the quality of the current link between node device 310 and the neighbor node device can degrade or the quality of other links between node device 310 and other neighbor node devices can improve.

Consequently, after the completion of each iteration of steps 404-420, the neighbor node device with the highest quality score may not be the neighbor node device used during the previous iteration to transfer blocks of the dataset to node device 310. Thus, after each iteration of steps 404-420, when device node 310 selects the neighbor node device with the highest quality score, device node 310 may be switching from a neighbor node device with a functioning communication link to a different neighbor node device with a preferred (or "higher quality") communication link. That is, transfer of the dataset is switched to a preferred communication link to improve the speed of the data transfer, and not to restart the data transfer after a communication link with a neighbor node device has been lost. Thus, the speed of the data transfer can be significantly improved with no change in the hardware included in the mesh network.

In step 412, node device 310 requests one or more blocks of the dataset. For example, when a dataset to be transferred includes 100 blocks, node device 310 may request the next block or blocks of the dataset. Typically, node device 310 requests one block of the dataset in step 412, but in some embodiments, node device 310 requests multiple blocks of the dataset. In either case, when node device 310 selects a different neighbor node device in a subsequent iteration of step 410 to continue the data transfer, at least one portion of the data transfer is received from one neighbor node device and another portion of the data transfer is received from another neighbor node device.

In step 414, node device 310 receives the blocks of the dataset requested in step 412 from the currently selected neighbor node device.

In step 418, node device 310 determines whether there are any remaining blocks of the dataset associated with the data transfer to be received. If yes, method 400 proceeds to step 420; if no, method 400 proceeds to step 430 and terminates.

In step 420, node device 310 determines whether a quality check criterion has been met, which indicates that node device 310 checks for better communication links. In some embodiments, node device 310 determines that the quality check criterion has been met by: determining that the most recently selected neighbor node device (e.g., during step 410) is operating in a long-range physical layer mode; determining that a quality score associated with the neighbor node device is below a first predetermined threshold value, such as the quality score determined in step 408; determining that a packet success rate associated with receipt of blocks from the currently selected neighbor node is below a second threshold value; determining that a data rate associated with the neighbor node device is below a third threshold value; determining that a total number of blocks of the dataset that have been received by node device 310 during the data transfer exceeds a fourth threshold value; determining that a communication link with the neighbor node device has been lost; and/or determining that a quality check period has expired, such as a repeating time interval that can expire multiple times during the course of the data transfer. In some embodiments, the duration of the quality check period can be based on a fixed time interval, e.g., 30 minutes. Additionally or alternatively, in some embodiments, the duration of the quality check period can be based on a size of the dataset and/or a type of the physical layer mode being used to communicate with the selected neighbor node device.

In some embodiments, in step 420, when node device 310 determines that the quality check criterion has been met, method 400 returns to step 408, and node device 310 determines a new quality score for each neighbor node device that has replied to the request of step 404. In such embodiments, node device 310 can be configured to maintain a record of responses to the request of step 404, and such information can be employed in the next iteration of step 408 when determining the new quality score for each neighbor node device. When node device 310 determines that the quality check criterion has not been met, no quality check is needed, and method 400 returns to step 412.

In other embodiments, in step 420, when node device 310 determines that the quality check criterion has been met, method 400 returns to step 404, and node device 310 sends a new request to neighbor node devices in the mesh network. In such embodiments, an updated set of neighbor node devices can be generated based on the replies to the new request. For example, in some instances, while node device 310 is requesting and receiving blocks from one neighbor node device in steps 412 and 416, another neighbor node device can complete the downloading of the data transfer and becomes available to forward portions of the data transfer to node device 310. Thus, in such embodiments, the request in step 404 is transmitted to an updated set of neighbor node devices. In some embodiments, node device 310 modifies peer information in a neighbor table with information included in the one or more replies. As with the previously described embodiments of step 420, when node device 310 determines that the quality check criterion has not been met, no quality check is needed, and method 400 returns to step 414.

In sum, techniques disclosed herein facilitate data transfer within a mesh network. In some embodiments, a data transfer from a neighbor node device in the mesh network is not limited to being carried out by the first neighbor node device that replies to a request for the data transfer. Instead, the neighbor node device having the highest quality score is selected for the data transfer, such as a neighbor node device that has the best or most reliable link with the requesting node device. Further, in some embodiments, over the course of the data transfer, a periodic check is performed to determine whether a neighbor node device that has a higher-bandwidth connection is available to complete the data transfer.

1. In some embodiments, a method includes: sending, by a first node device to a plurality of neighbor node devices, a query associated with a dataset, wherein the dataset includes multiple blocks; receiving, at the first node device from a set of the plurality of neighbor node devices, one or more responses to the query; based on a first quality ranking of individual node devices in the set, selecting, by the first node device, a second node device from the set; and sending, by the first node device, a first request to the second node device for at least one block of the multiple blocks.

2. The method of clause 1, further comprising: after sending the first request to the second node device, determining, at the first node device, that a quality check criterion has been met; and in response, determining, at the first node device, a second quality ranking of individual node devices in the set.

3. The method of clauses 1 or 2, further comprising: based on the second quality ranking, selecting, by the first node device, a third node device from the set; and sending, by the first node device, a second request to the third node device for at least one block of the multiple blocks.

4. The method of any of clauses 1-3, wherein determining that the quality check criterion has been met comprises at least one of: determining that the second node device is operating in a long-range physical layer mode, determining that a quality score associated with the second node device is below a first predetermined threshold value, determining that a packet success rate associated with receipt of the at least one block by the first node device is below a second predetermined threshold value, determining that a data rate associated with the second node device is below a third predetermined threshold value, determining that a number of blocks of the multiple blocks that have been received by the first node device exceeds a fourth predetermined threshold value, determining that a communication link with the second node device has been lost, or determining that a quality check period has expired.

5. The method of any of clauses 1-4, wherein a duration of the quality check period is based on a fixed time interval and a type of link communicatively coupling the first node device to the second node device.

6. The method of any of clauses 1-5, wherein selecting the second node device from the set based on the first quality ranking of individual node devices in the set comprises: determining, at the first node device, a respective quality score for each of the individual node devices based on at least one quality factor; and determining, at the first node device, that the quality score for the second node device is a highest quality score.

7. The method of any of clauses 1-6, wherein the at least one quality factor comprises one or more of a type of link communicatively coupling the first node device to the individual node device, a current data rate between the first node device and the individual node device, a packet success rate between the first node device and the individual node device, or a current traffic level at the individual node device.

8. The method of any of clauses 1-7, wherein determining the respective quality score for each of the individual node devices based on at least one quality factor comprises determining the respective quality score based on information that is stored at the first node device prior to receiving the one or more responses at the first node device.

9. In some embodiments, one or more non-transitory computer-readable media at a first node device in a network store program instructions that, when executed by one or more processors at the first node device, cause the one or more processors at the first node device to perform the steps of: transmitting, by the first node device to a plurality of neighbor node devices, a query associated with a dataset, wherein the dataset includes multiple blocks; detecting, at the first node device from one or more of the plurality of neighbor node devices, one or more responses to the query; based on a first quality ranking of individual node devices in the one or more neighbor node devices that provide a response to the query, selecting, by the first node device, a second node device from the one or more neighbor devices; and transmitting, by the first node device, a first request to the second node device for at least one block of the multiple blocks.

10. The one or more non-transitory computer-readable media of clause 9, wherein the steps further comprise: after transmitting the first request to the second node device, determining, at the first node device, that a quality check criterion has been met; and in response, determining, at the first node device, a second quality ranking of individual node devices in the set.

11. The one or more non-transitory computer-readable media of clauses 9 or 10, wherein the steps further comprise: based on the second quality ranking, selecting, by the first node device, a third node device from the one or more neighbor node devices providing a response to the query; and transmitting, by the first node device, a second request to the third node device for at least one block of the multiple blocks.

12. The one or more non-transitory computer-readable media of any of clauses 9-11, wherein determining that the quality check criterion has been met comprises at least one of: determining that the second node device is operating in a long-range physical layer mode, determining that a quality score associated with the second node device is below a first predetermined threshold value, determining that a packet success rate associated with receipt of the at least one block by the first node device is below a second predetermined threshold value, determining that a data rate associated with the second node device is below a third predetermined threshold value, determining that a number of blocks of the multiple blocks that have been received by the first node device exceeds a fourth predetermined threshold value, determining that a communication link with the second node device has been lost, or determining that a quality check period has expired.

13. The one or more non-transitory computer-readable media of any of clauses 1-12, wherein a duration of the quality check period is based on a fixed time interval and a type of link communicatively coupling the first node device to the second node device.

14. The one or more non-transitory computer-readable media of any of clauses 1-13, wherein selecting the second node device from the one or more neighbor node devices providing a response to the query comprises: determining, at the first node device, a respective quality score for each of the individual node devices based on at least one quality factor; and determining, at the first node device, that the quality score for the second node device is a highest quality score.

15. The one or more non-transitory computer-readable media of any of clauses 1-14, wherein the at least one quality factor comprises one or more of a type of link communicatively coupling the first node device to the individual node device, a current data rate between the first node device and the individual node device, a packet success rate between the first node device and the individual node device, or a current traffic level at the individual node device.

16. The one or more non-transitory computer-readable media of any of clauses 1-15, wherein the at least one quality factor comprises a weighted combination of multiple quality factors.

17. In some embodiments, a system includes: a plurality of node devices included in a wireless mesh network; a first node device included in the plurality of node devices, the first node device being configured to perform the steps of: sending, to a plurality of neighbor node devices, a query associated with a dataset, wherein the dataset includes multiple blocks; receiving, from a set of the plurality of neighbor node devices, one or more responses to the query; based on a first quality ranking of individual node devices in the set, selecting a second node device from the set; and sending a first request to the second node device for at least one block of the multiple blocks.

18. The system of clause 17, wherein the steps further comprise: after sending the first request to the second node device, determining that a quality check criterion has been met; and in response, determining a second quality ranking of individual node devices in the set.

19. The system of clauses 17 or 18, wherein the steps further comprise: after sending the first request to the second node device, determining, at the first node device, that a quality check criterion has been met; and in response, determining, at the first node device, a second quality ranking of individual node devices in the set.

20. The one or more non-transitory computer-readable media of any of clauses 1-19, wherein determining the second quality ranking of individual node devices in the set comprises: sending, by the first node device to the plurality of neighbor node devices, another query associated with the dataset; and receiving, at the first node device from another set of the plurality of neighbor node devices, one or more responses to the query.

Any and all combinations of any of the claim elements recited in any of the claims and/or any elements described in this application, in any fashion, fall within the contemplated scope of the present protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:
   identifying, by a first node device in a mesh network, a plurality of neighbor node devices that have one or more blocks of a dataset;
   determining, by the first node device, quality scores for respective node devices of the plurality of neighbor node devices;
   selecting, by the first node device based on the quality scores, a second node device from the plurality of neighbor node devices; and
   sending, by the first node device to the second node device, a first request to receive at least one block of the one or more blocks.

2. The method of claim 1, wherein selecting the second node device from the plurality of neighbor node devices comprises determining that the second node device has a highest quality score of the quality scores.

3. The method of claim 1, wherein a first quality score of the second node device is based on at least one of:
   a type of a link communicatively coupling the first node device to the second node device,
   a data rate of the link,
   a packet success rate for packets sent using the link, or
   an amount of network traffic at the second node device.

4. The method of claim 1, wherein a first quality score for the second node device is based on a weighted combination of a plurality of quality factors associated with the second node device.

5. The method of claim 1, further comprising:
   after sending the first request to the second node device, determining, at the first node device, that a quality check criterion has been met; and
   in response to the quality check criterion being met, determining, at the first node device, updated quality scores for the respective node devices of the plurality of neighbor node devices.

6. The method of claim 5, further comprising:
   selecting, by the first node device based on the updated quality scores, a third node device from the plurality of neighbor node devices; and
   sending, by the first node device to the third node device, a second request to receive at least one or more additional blocks of the dataset.

7. The method of claim 5, wherein determining that the quality check criterion has been met comprises at least one of:
   determining that the second node device is operating in a long-range physical layer mode,
   determining that a first quality score associated with the second node device is below a first threshold value,
   determining that a packet success rate associated with receipt of the at least one block by the first node device is below a second threshold value,
   determining that a data rate associated with the second node device is below a third threshold value,
   determining that a number of blocks of the dataset that have been received from the second node device exceeds a fourth threshold value,
   determining that a communication link with the second node device has been lost, or
   determining that a quality check period has expired.

8. The method of claim 7, wherein a duration of the quality check period is based on:
   a fixed time interval; or
   a type of link coupling the first node device to the second node device.

9. The method of claim 1, wherein identifying the plurality of neighbor node devices that have the one or more blocks of the dataset comprises:
   sending respective queries to the respective node devices of the plurality of neighbor node devices; and
   receiving respective responses to the respective queries from the respective node devices of the plurality of neighbor node devices.

10. One or more non-transitory computer-readable media storing program instructions that, when executed by one or more processors of a first node of a mesh network, cause the one or more processors to perform operations comprising:
    identifying a plurality of second nodes of the mesh network that have one or more portions of a dataset and are neighbors to the first node;
    determining quality rankings for respective nodes of the plurality of second nodes;
    selecting, based on the quality rankings, a third node from the plurality of second nodes; and
    transmitting, to the third node, a request to receive the one or more portions of the dataset.

11. The one or more non-transitory computer-readable media of claim 10, wherein selecting the third node from the plurality of second nodes comprises determining that a first quality ranking of the third node is a highest quality ranking of the quality rankings.

12. The one or more non-transitory computer-readable media of claim 10, wherein a first quality ranking of the third node is based on at least one of:
    a type of a link coupling the first node to the third node,
    a data rate of the link,
    a success rate for messages transmitted over the link, or
    a network traffic level at the third node.

13. The one or more non-transitory computer-readable media of claim 10, wherein the operations further comprise calculating a weighted sum of a plurality of quality factors associated with the third node to determine a first quality ranking for the third node.

14. The one or more non-transitory computer-readable media of claim 10, wherein the operations further comprise:
    after transmitting the request to the third node, determining that a quality check condition has been met;
    in response to the quality check condition being met, determining updated quality rankings for the plurality of second nodes;
    selecting, based on the updated quality rankings, a fourth node from the plurality of second nodes; and
    transmitting, to the fourth node, a request to receive one or more additional portions of the dataset.

15. The one or more non-transitory computer-readable media of claim 10, wherein the quality rankings are determined based on information that is stored at the first node prior to identifying the plurality of second nodes.

16. The one or more non-transitory computer-readable media of claim 10, wherein the dataset comprises a firmware update for the first node.

17. A network device in a mesh network, the network device comprising:
one or more processors, and
a memory storing instructions that, when executed by the one or more processors, cause the one or more processors to perform operations comprising:
determining which of a plurality of neighboring network devices in the mesh network have at least part of a dataset;
determining quality values for respective network devices of the plurality of neighboring network devices that have at least part of the dataset;
selecting, based on the quality values, a second network device from the plurality of neighboring network devices that have at least part of the dataset; and
requesting, from the second network device, at least one block from the dataset.

18. The network device of claim 17, wherein selecting the second network device from the plurality of neighboring network devices that have at least part of the dataset comprises determining that a first quality value of the second network device is a highest quality value of the quality values.

19. The network device of claim 17, wherein the operations further comprise calculating a weighted sum of a plurality of quality factors associated with the second network device to determine a first quality value for the second network device.

20. The network device of claim 17, wherein determining which of the plurality of neighboring network devices that have at least part of the dataset comprises:
transmitting respective queries to network devices that are neighbors to the network device; and
receiving respective responses to the respective queries from the plurality of neighboring network devices that have at least part of the dataset.

* * * * *